Oct. 19, 1943.　　　F. T. FLINT　　　2,332,442
WINDSHIELD WIPER MOTOR
Filed Dec. 4, 1941　　　2 Sheets-Sheet 1
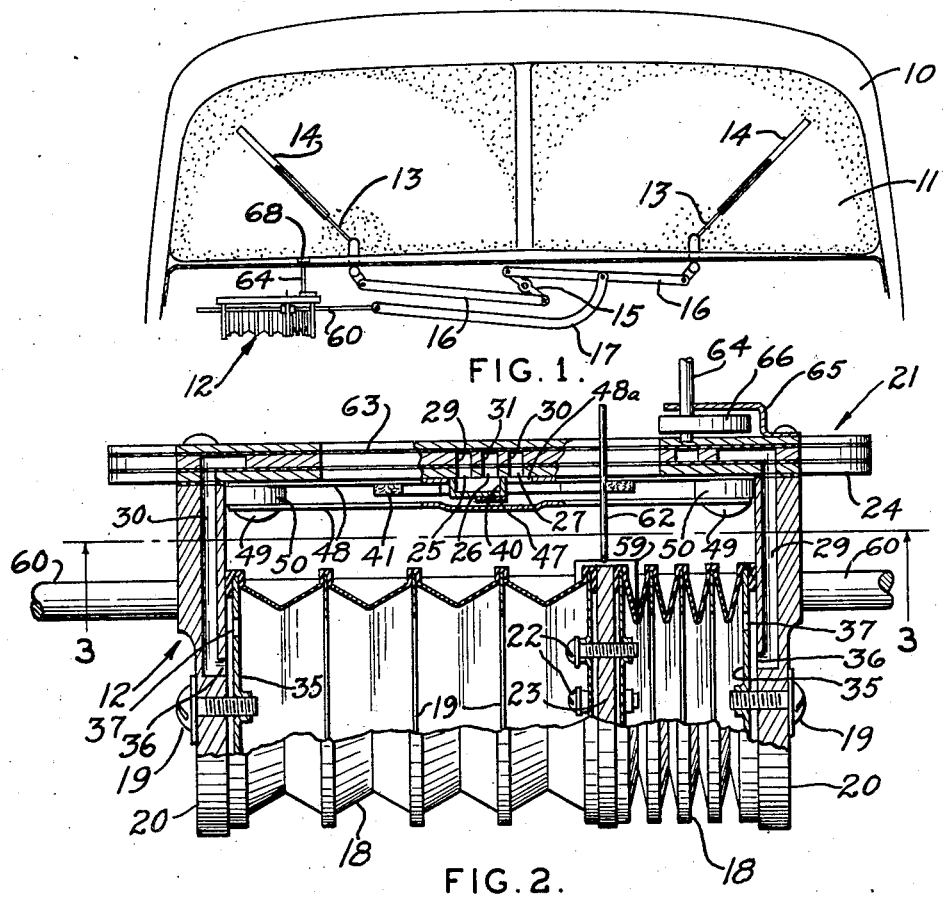
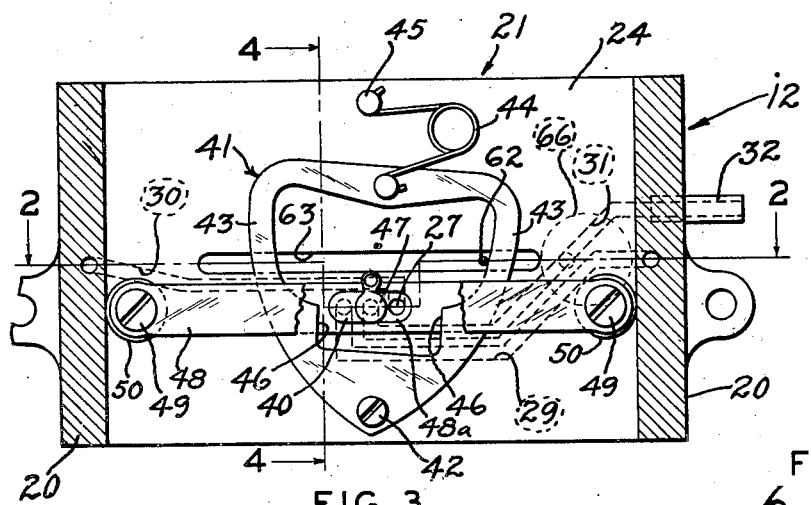
INVENTOR
FORREST T. FLINT
Donald U. Rich
ATTORNEY Oct. 19, 1943.  F. T. FLINT  2,332,442
WINDSHIELD WIPER MOTOR
Filed Dec. 4, 1941   2 Sheets-Sheet 2

INVENTOR
FORREST T. FLINT
ATTORNEY

Patented Oct. 19, 1943

2,332,442

UNITED STATES PATENT OFFICE 2,332,442

WINDSHIELD WIPER MOTOR

Forrest T. Flint, Florissant, Mo., assignor to Carter Carburetor Corporation, St. Louis, Mo., a corporation of Delaware Application December 4, 1941, Serial No. 421,535

7 Claims. (Cl. 121—164)

This invention relates to differential fluid pressure motors of the type adapted for use with vehicle windshield wipers and consists, particularly, in novel valving and parking mechanism.

Where a windshield wiper motor is stopped or parked by the interposition of a physical stop into the path of movement of a part of the motor or transmission mechanism, it is desirable to maintain differential pressures applied to the motor so as to hold the wiper blades in the preselected parking positions. However, such pressures bearing against the parking stop substantially resist the withdrawal thereof from the parking position when it is desired to re-start the motor. Furthermore, such parking means, in its simplest form, results in the wiper blades being parked inside the limit of their normal stroke, whereas it is desirable that the blades park either at the extreme ends of their strokes or therebeyond.

Accordingly, it is an object of the present invention to provide for parking a windshield wiper motor by the manual interposition of a stop into the path of a movable part of the motor and to substantially reduce the above noted resistance to withdrawal of the parking stop.

Another object is to provide a parking device of the above type which permits the motor and wiper blades to approach or even move beyond the normal extreme ends of their strokes when parked.

Still another object is to provide a simple, sturdy, and inexpensive fluid motor which is especially adapted for use in operating windshield wiper blades.

These objects and other more detailed objects hereafter appearing are attained substantially by the structure illustrated in the accompanying drawings in which Fig. 1 is a view of a vehicle windshield having wiper blades and operating mechanism mounted adjacent thereto.

Fig. 2 is a side view and longitudinal vertical section through the motor taken substantially on line 2—2 of Fig. 3.

Fig. 3 is a horizontal section taken substantially on line 3—3 of Fig. 2 and showing the valve actuator just at the point of shifting.

Figures 4, 5:
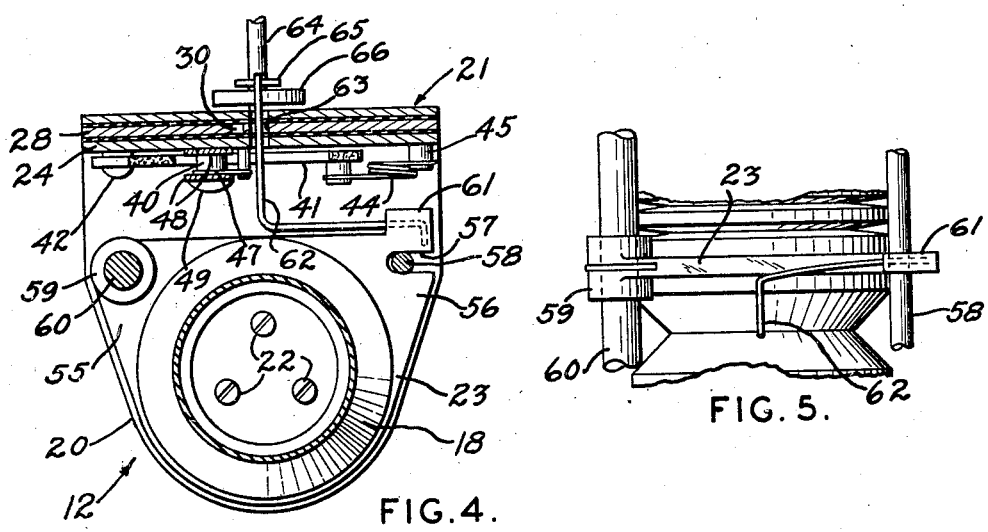
Fig. 4 is a transverse section taken substantially on line 4—4 of Fig. 3.
Fig. 5 is a detail top view illustrating the valve actuating wire distorted as in the parked position.

Fig. 1 shows a portion 10 of an automobile body including a windshield 11. Mounted in any suitable manner beneath the windshield and preferably obscured by the usual dash board (not shown) is a windshield wiper operating motor generally designated at 12. The usual pivotally supported windshield wiper arms 13 and blades 14 are operated by the motor through the intermediary of transmission linkage including a pivoted lever 15, connecting links 16 extending to the wiper arms, and a driving link 17 connecting the motor to one of the links 16.

The motor, as shown in substantial detail in the remaining figures, is formed of a pair of opposing bellows 18, conveniently formed of a pliable material such as synthetic rubber, and having circumferential reinforcing rings 19 at intervals. The opposite ends of bellows 18 are secured by screws 19 to projecting members 20 on the stationary base plate structure 21. The adjacent ends of the bellows are secured by screws 22 to a plate 23 which constitutes the movable driving part of the motor.

Base plate 21 is of laminated structure, the lower layer or sheet 24 thereof having ports 25, 26 and 27 therethrough. The middle sheet 28 of the base plate is slotted to form passages 29 and 30 connecting, respectively, left hand port 25 and right hand bellows 18 and right hand port 27 and left hand bellows 18. An additional slot in sheet 28 forms the suction passage 31 which extends from central port 26 to the edge of the base plate where it terminates in a fitting 32 for attachment of a hose or tube running to the engine intake manifold or other source of suction. Motor passages 29 and 30 extend longitudinally through the base plate, as shown in Fig. 3, and then downwardly through bellows supporting extensions 20, as shown in Fig. 2, these extensions and the outer end plates 35 of the bellows being ported as at 36 and 37 for exposing the interior of the bellows, respectively, to the fluid pressure conditions existing in passages 29 and 30.

A hood valve 40 slidably engages the lower face of the base plate and is shaped and positioned so as to cover central suction port 26 and one or the other of the motor ports 25 and 27, the uncovered port being exposed to atmosphere. A valve actuator yoke 41, conveniently formed of fiber, is pivoted to the base plate as at 42 and has side arms 43 straddling valve 40. A partially coiled compression spring 44 extends between a pin 45 on the base plate, opposite pivot 42, and the free end of actuator yoke 41 so as to quickly urge the actuator sidewardly when it is moved past its center position. Actuator arms 43 have opposing shoulders 46 for directly engaging hood valve 40. A small leaf spring 47, attached to the base plate, rests upon the hood valve for maintaining the same firmly in slidable engagement with the valve plate so as to prevent leaks. A pair of strips 48 are secured to the base plate by screws 49. One strip lies against base plate 24 and is slotted at 48a for directing and limiting the travel of valve 40. The other strip is spaced from the base plate and extends under actuator yoke 41 so as to maintain the same in a substantially horizontal position and in operative relationship with valve 40. Rubber sleeve bumpers 50 are provided on screws 49 to limit the throw of yoke 41.

As best shown in Fig. 4, movable motor plate 21 has a curved lower edge to conform, in general, with the shape of the bellows, but has a horizontal upper portion extended laterally to form ears 55 and 56. Ear 56 is slotted as at 57 for slidably receiving a guide rod 58 which is rigidly secured at its opposite ends to base plate extensions 20. Ear 55 has an apertured boss 59 rigidly receiving a driving rod 60 which extends through and is guided by the base plate extensions. The right hand end of rod 60 (Figs. 1 and 2) is pinned to connecting link 17.

Ear portion 56 of movable motor plate 21 is enlarged upwardly, as at 61, for rigid attachment of one end of a bent, spring wire 62 having a portion extending horizontally along the upper edge of plate 21 parallel to the general plane of actuator yoke 41, and a second portion extending at a right angle thereto toward actuator yoke and through a slot 63 in the base plate. Wire 62 extends between arms 43 of valve actuating yoke 41, and serves to move this yoke over-center substantially at the end of the motor stroke to initial shifting of the valve. The hood valve, valve actuator, and actuating spring 44 constitute a quick action, over-center valve mechanism.

Figure 6:
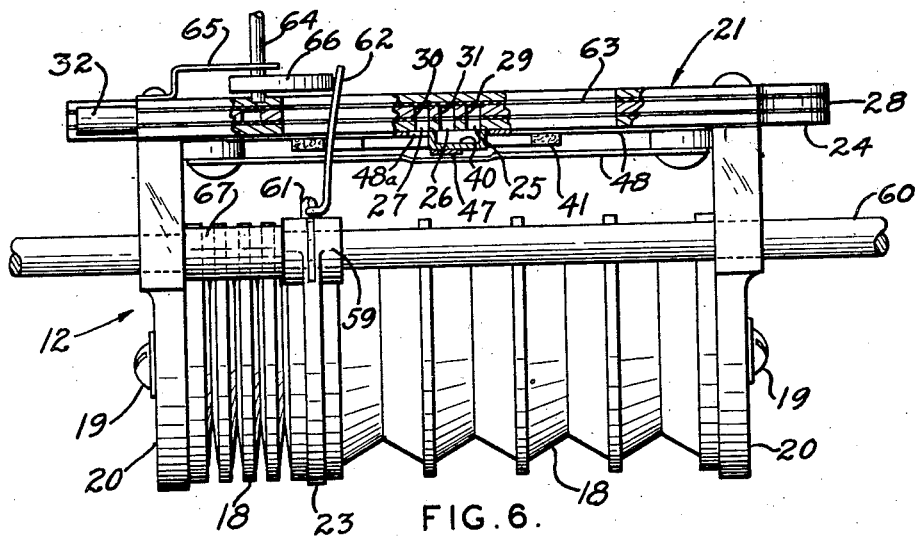
Fig. 6 is a side view of the motor, portions of the base plate being cut away and sectioned for clearer illustration and the parts being shown in the parked position.

A rod or pin 64 has a bearing in the top face of base plate 21 adjacent the end of slot 63 and is journalled in a small right angle bracket 65 secured to the top of the base plate. A cam 66 is formed or secured rigidly on pin 64 beneath bracket 65 and is positioned and shaped so that when the low portion of the cam is adjacent the end of slot 63, spring wire 62 is permitted its full motion so as to trip the valve actuator and valve at the end of the motor stroke. However, when the high point of cam 66 is moved adjacent the end of slot 63, this cam engages and stops wire 62 prior to shifting of the valve actuator. In the parked position, as shown in Fig. 6, wire 62 is subjected to torsion and bending distortions and permits driving plate 23 to move substantially beyond its position at the movement of engagement of the cam by the wire. A sleeve 67 on rod 60 engages left hand base plate extension 20 in the parked position to limit the throw of the motor. Operation of the parking cam is effected by means of a button 68 on shaft 64 which extends above the dash board into a convenient position for operation by the driver.

Figure 7:
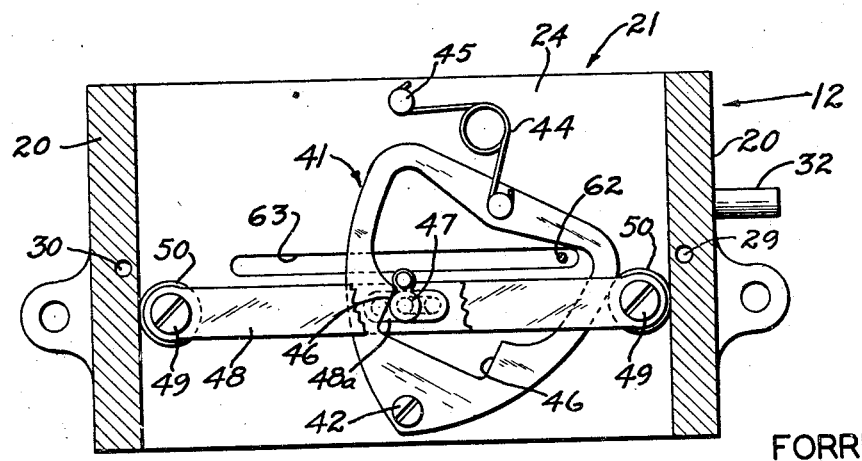
Fig. 7 is a view similar to Fig. 3, but showing the valve actuator just after being shifted.

The operation and advantages of the above mechanism are as follows:

When fitting 32 is connected to a suitable source of suction, and parking cam 66 moved to the "on" position, as in Fig. 2, motor driving plate 23 will be caused to operate first in one direction until wire 62 engages and shifts actuator yoke 41 over-center. Spring 44, then, shifts actuator yoke 41 causing one of the shoulders 46 to strike and reverse hood valve 40. Thereupon, the pressure conditions applied to the opposite faces of driving plate 23 will be reversed and this plate will move in the opposite direction, of course, carrying with it driving rod 59 and the wiper arms and blades connected thereto. Figs. 2 and 3 show actuator yoke 41 moved just past its center position by wire 62 and ready to be snapped the remainder of its throw against one of the bumper bushings 50 by spring 44. Fig. 7 shows actuator yoke 41 in its right hand stable position with hood valve 40 connecting the middle suction passage and right hand motor port 27 so as to direct suction into the left hand bellows 18 and cause movement of driving plate 21 to the left. The motor will be caused to reciprocate in this fashion as long as suction is applied thereto and the parking cam retained in its "on" position.

To stop the motor, cam 65 is rotated so as to bring the high point thereof into position to interfere with full movement of spring wire 62 and prevent shifting of actuator yoke 41. Driving plate 21 continues until sleeve 67 strikes the adjacent base plate projection 20 whereupon the motor stops. This sleeve determines the parked position of the wiper blades which may be adjusted by varying the length of the sleeve, or by otherwise adjusting the stopping position of the driving plate. This construction permits over-parking of the blades, if desired. The length and strength of wire 62 is adjusted in relation to its distortion in the parked position so that the wire will not be excessively strained and its life thereby shortened.

To re-start the motor, parking button 68 and the cam are rotated to the "on" position in Fig. 2 so as to release spring wire 62 to shift yoke 41 over-center by its own resiliency. Even though the motor is stopped by engagement of sleeve 67 with extension 20, considerable force will be applied by wire 62 against the cam, but the resiliency of this wire greatly reduces the frictional resistance to turning of the cam caused thereby.

It would be within the spirit of the invention to eliminate stop 67 and construct spring element 62 of sufficient strength to stop the motor. In this case, the resiliency of wire 62 would be particularly advantageous in facilitating restarting of the motor. The particular form of the cam stop and spring wire are not essential. Similarly various functional features of the motor and valve mechanism may be modified as will occur to those skilled in the art and the exclusive use of all such modifications as come within the scope of the appended claims is contemplated.

I claim:

1. In a fluid pressure motor, a linearly movable driving member, ports and a cooperating valve adjacent said member for controlling the application of differential pressures thereto, a spring wire projecting from said member, a pivoted valve actuator, and an over-center spring connected thereto, said wire being disposed to engage said actuator near the end of the motor stroke to shift the same and said spring over-center and cause said spring to reverse said valve.

2. In a fluid motor, a movable driving member, ports and a cooperating valve and valve shifting mechanism adjacent said member for controlling the application of differential pressures thereto, and a spring wire secured at one end to said driving member and having a free end disposed to engage said valve mechanism at the end of the motor stroke to shift said valve, said wire having its free portion bent to extend from said driving member parallel to the general plane of said mechanism and then towards said plane so as to subject said wire to twisting and bending during actuation of said mechanism.

3. In a fluid motor, a movable driving member, ports and valve mechanism for alternately subjecting said member to differential fluid pressures, a resilient element projecting from said member for engaging and shifting said valve mechanism at the end of the motor stroke, and a stop movable to and from a position to be engaged by and interfere with the travel of said resilient element prior to shifting of said mechanism to stop the motor.

4. A fluid motor as specified in claim 3 in which said resilient element is in the form of a spring wire between said driving member and said valve mechanism and stop.

5. In a fluid motor, a base plate, having ports therein, a movable driving structure, a hood valve slidable on said plate for connecting different ones of said ports to alternately expose said driving structure to differential fluid pressures, a valve actuator straddling said valve and located in the path of said driving structure for shifting thereby, a spring element resting on said valve and urging the same against said base plate, and a guard element extending across said actuator for maintaining the same in operative relationship with said driving structure and said valve.

6. In a windshield wiper motor, a movable driving member, a valve plate having ports, a valve for connecting selected ones of said ports, a valve actuator, a resilient element between said driving member and said actuator for shifting the same and said valve adjacent the end of the motor stroke to reverse the motor, and a parking stop manually movable to and from its parking position in the path of said resilient element, said element yielding upon engagement with said stop to permit limited movement of said driving member beyond its position when said first stop is first engaged by said element.

7. In a fluid motor, a movable driving member, ports and valve mechanism for alternately subjecting said member to different fluid pressures, a resilient element projecting from and normally movable with said member for engaging and shifting said valve mechanism at the end of the motor stroke, and stop structure movable laterally, with respect to the normal path of said resilient element, to and from a position to interfere with said normal travel of said element, prior to shifting of said valve mechanism, to stop the motor, the resiliency of said element facilitating withdrawal of said stop structure from engagement with said element in re-starting the motor.

FORREST T. FLINT.